(12) United States Patent
Iwasaki et al.

(10) Patent No.: US 8,428,896 B2
(45) Date of Patent: Apr. 23, 2013

(54) MALFUNCTION DETECTING APPARATUS

(75) Inventors: Katsuyuki Iwasaki, Makinohara (JP); Masashi Sekizaki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 193 days.

(21) Appl. No.: 11/976,520

(22) Filed: Oct. 25, 2007

(65) Prior Publication Data
US 2008/0103707 A1    May 1, 2008

(30) Foreign Application Priority Data
Oct. 26, 2006 (JP) .................................. 2006-290752

(51) Int. Cl.
*G06F 19/00* (2011.01)
(52) U.S. Cl.
USPC .......................................................... 702/63
(58) Field of Classification Search .................... 702/63, 702/66, 69, 182–185
See application file for complete search history.

(56) References Cited

U.S. PATENT DOCUMENTS 5,672,973 A * 9/1997 Arai et al. ...................... 324/427
6,255,826 B1 * 7/2001 Ohsawa et al. ............... 324/426
2002/0167291 A1 * 11/2002 Imai et al. ..................... 320/119

FOREIGN PATENT DOCUMENTS

| JP | 2000-074786 | 3/2000 |
| JP | 2003-243044 | 8/2003 |

OTHER PUBLICATIONS

Office Action mailed May 15, 2012, issued for the corresponding Japanese Patent Application No. 2006-290752.

* cited by examiner

*Primary Examiner* — Edward Raymond
(74) *Attorney, Agent, or Firm* — Edwards Wildman Palmer LLP

(57) ABSTRACT

A malfunction detecting apparatus for detecting a malfunction of a voltage detecting device accurately, including a low-voltage-system CPU which controls voltage detecting circuits to detect voltage between both terminals of one unit cell from among unit cells included in blocks corresponding to voltage detecting circuits. When variation of the voltage between both terminals detecting by the low-voltage-system CPU is at least an allowable error determined by a detection accuracy of the voltage detecting circuits, an abnormal condition of the voltage detecting circuits is detected.

5 Claims, 3 Drawing Sheets

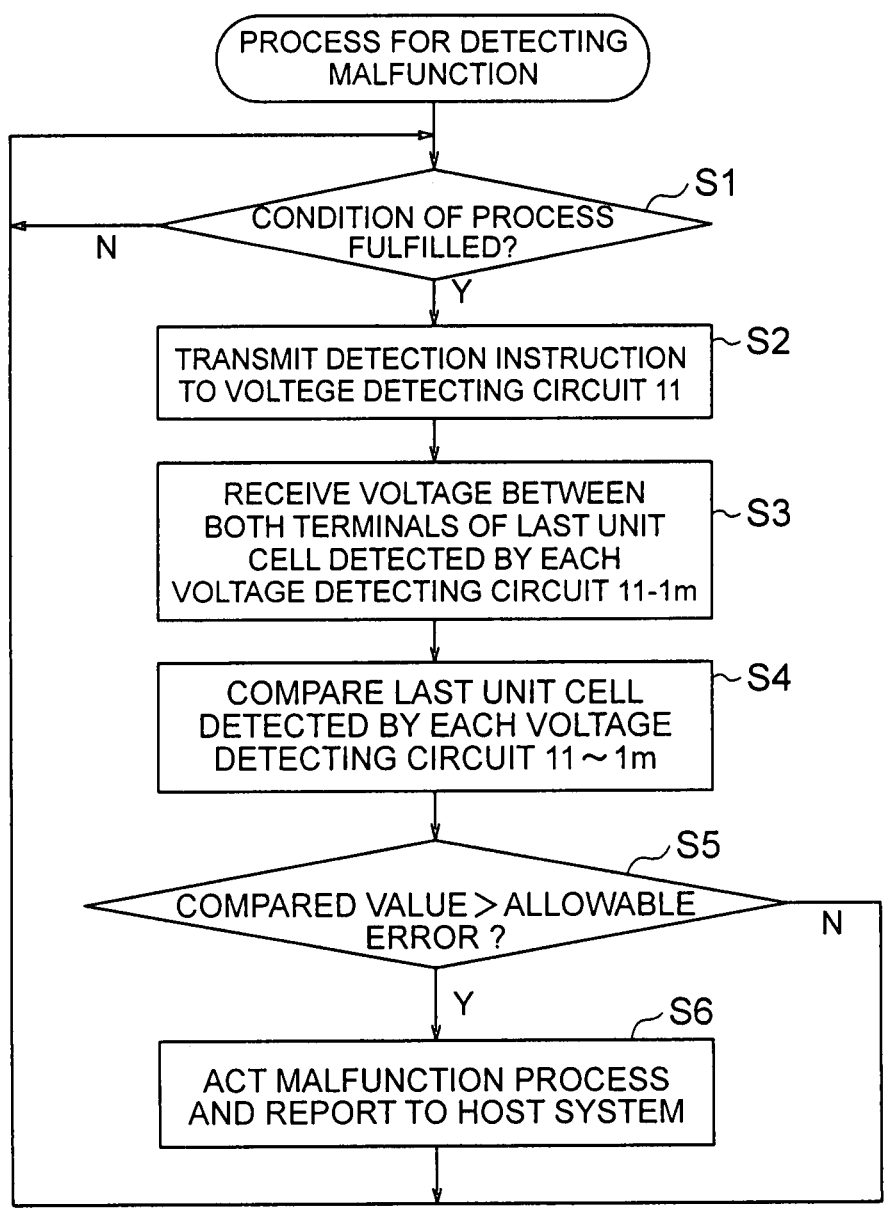

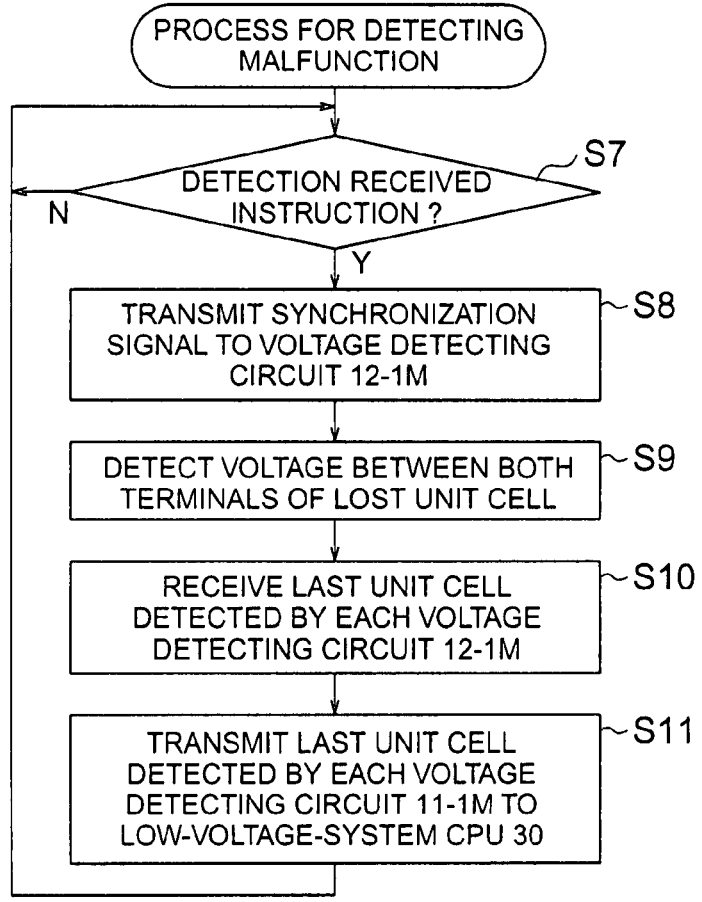
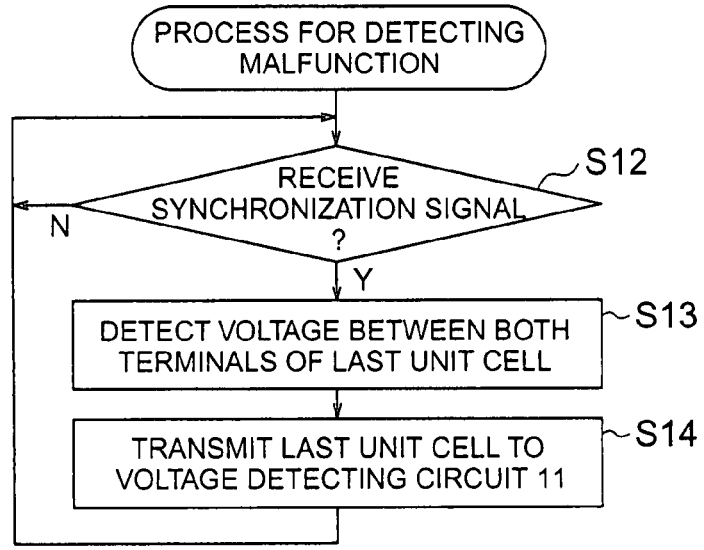

MALFUNCTION DETECTING APPARATUS

The priority application Number Japan Patent Application No. 2006-290752 upon which this patent application is based is hereby incorporated by reference.

BACKGROUND OF THE INVENTION

1. Field of the Invention

The present invention relates to a malfunction detecting apparatus, especially having a plurality of voltage detecting devices and a malfunction detecting device. The plurality of voltage detecting devices detects each voltage between both terminals of unit cells, which are secondary-battery types, forming the block, and is provided corresponding to each block of a plurality of blocks divided from a battery pack having a plurality of unit cells connected in series with each other. The malfunction detecting device detects an abnormal condition of the voltage detecting device based on each voltage between both terminals of each unit cell detected by the plurality of voltage detecting devices.

2. Description of the Related Art

Conventionally, as an above mentioned malfunction detecting apparatus, a voltage detecting apparatus for a battery pack described in patent document 1 is proposed. The voltage detecting apparatus for the battery pack has a plurality of voltage detecting circuits (voltage detecting devices) and a total voltage detecting circuit and a controller (a malfunction detecting device). The plurality of voltage detecting circuits is arranged corresponding to each block of a plurality of blocks divided from the battery pack having a plurality of unit cells connected in series with each other. The plurality of voltage detecting circuits detects each voltage between both terminals of unit cells included in the block corresponding thereto.

The total voltage detecting circuit detects the voltage between both terminals of the battery pack. A communication line is arranged between each of the plurality of voltage detecting circuits and the controller, and it is capable of communicating with each of the plurality of the voltage detecting circuits and the controller. In addition, a communication line is arranged between the total voltage detecting circuit and the controller, and it is capable of communicating with the total voltage detecting circuit and the controller.

The controller detects an abnormal condition of the voltage detecting circuit by comparing the voltage between both terminals of the battery pack calculated from a sum of voltages between both terminals of all unit cells detected by the plurality of voltage detecting circuits and the voltage between both terminals of the battery pack detected by the total voltage detecting circuit.

Patent document 1:
Japan published patent application 2003-243044
Patent document 2:
Japan published patent application 2000-74786

SUMMARY OF THE INVENTION

The above mentioned voltage detecting apparatus for an assembled battery calculates a sum of voltages between both terminals of all unit cells, which are detected by the plurality of voltage detecting circuits. Consequently, for example, when the number of the unit cells is eighty, a maximum detection error of the battery pack calculated from the above sum becomes eighty-fold of a detection error of one voltage detecting circuit.

It is difficult to compare the voltage between both terminals of the battery pack calculated from the sum of the voltages between both terminals of all unit cells, which includes the detection error of eighty-fold, and the voltage between both terminals of the battery pack detected by total voltage detecting circuits with high accuracy. When increasing the number of the unit cells, the voltage of the battery pack changes by a vehicle condition during detection of the voltages between both terminals of all unit cells. As a result, the above comparison cannot be performed with high accuracy. Thereby, an abnormal condition of the plurality of voltage detecting circuits cannot be detected accurately.

According to the above problem, an object of the present invention is to provide a malfunction detecting apparatus for detecting an abnormal condition of a voltage detecting device accurately.

According to a first aspect of the present invention, a malfunction detecting apparatus has a plurality of voltage detecting devices and a malfunction detecting device. The plurality of voltage detecting devices detects each voltage between both terminals of each unit cell, which is a secondary-battery type, included in blocks. The voltage detecting device is provided respectively to an associated block of a plurality of blocks. The blocks are divided from a battery pack formed with a plurality of unit cells connected in series with each other. The malfunction detecting device detects an abnormal condition of the voltage detecting device based on the voltages between both terminals of the unit cells, which are detected by the plurality of voltage detecting devices. The malfunction detecting device controls each voltage detecting device to detect the voltage between both terminals of one unit cell from among the unit cells included in the each block, which is provided correspondingly to each voltage detecting device. When a dispersion of each detected voltage between both terminals is at least a threshold value determined by a detection accuracy of the voltage detecting devices, the abnormal condition of the voltage detecting device is detected.

According to a second aspect of the present invention, the malfunction detecting apparatus has an equalization device. The equalization device equalizes the voltages between both terminals of the unit cells, which are detected by the plurality of voltage detecting devices when switching a vehicle ignition off. The malfunction detecting device controls each voltage detecting device to detect the voltage between both terminals of the one unit cell from among the unit cells included in the each block, which is provided correspondingly to each voltage detecting device when switching the vehicle ignition on.

According to a third aspect of the present invention, the malfunction detecting device controls each voltage detecting device to simultaneously detect the voltage between both terminals of one unit cell from among the unit cells included in each block, which is provided correspondingly to each voltage detecting device.

According to a fourth aspect of the present invention, the malfunction detecting device has further a first communication line, an isolation interface, and a second communication line. The first communication line is arranged between one of the plurality of voltage detecting devices and the malfunction detecting device. The isolation interface is arranged on the first communication line for communicating between one of the plurality of the voltage detecting devices and the malfunction detecting device in an isolation condition. The second communication line is arranged between one of the plurality of voltage detecting devices and a remainder of the plurality of voltage detecting devices. The malfunction detecting device transmits a detection instruction, which makes the voltage detecting device detect the voltage between both terminals of one unit cell from among the unit cells included in the block, through the first communication line and the isolation interface to one of the plurality of the voltage detecting devices. One of the plurality of the voltage detecting devices transmits a synchronization signal to a remainder of the voltage detecting devices through the second communication line in response to the detection instruction. The remainder of voltage detecting devices respectively detects the voltage between both terminals of the one unit cell from among the unit cells included in the corresponding block responsively to the synchronization signal.

According to the invention, by comparing each voltage between both terminals including a detecting error in a same range, the abnormal condition of the voltage detecting device can be detected accurately.

According to the invention, the equalization of the voltages between both terminals of the unit cells is performed when switching the vehicle ignition off. When switching the vehicle ignition on, the voltages between both terminals of the unit cells are almost same. Thereby, it can be judged that the variation of each voltage between both terminals detected at this time comes from the abnormal condition of the voltage detecting device. Thus, the abnormal condition of the voltage detecting device can be detected more accurately.

According to the invention, each voltage between both terminals of the unit cells detected at the same time can be compared, and the abnormal condition of the voltage detecting device can be detected more accurately.

According to the invention, it is not required to provide the first communication lines and the isolation interfaces between the malfunction detecting device and all of the voltage detecting devices. By providing the first communication line and the isolation interface between the malfunction detecting device and only one of the voltage detecting devices, the voltage between both terminals of the one unit cell from among the unit cells can be detected by the voltage detecting device so that its configuration becomes simple and a cost can be reduced.

The above and other objects and features of this invention will become more apparent from the following description taken in conjunction with the accompanying drawings.

BRIEF DESCRIPTION OF THE DRAWINGS

FIG. 2 is a flowchart showing processes for detecting an abnormal condition of a low-voltage-system CPU 30 included in the voltage detecting apparatus for the battery pack shown in FIG. 1;

FIG. 3 is a flowchart showing processes for detecting an abnormal condition of a high-voltage-system CPU 25 of the voltage detecting circuit 11 included in the voltage detecting apparatus for the battery pack shown in FIG. 1; and FIG. 4 is a flowchart showing processes for detecting an abnormal condition of a high-voltage-system CPU 25 of the voltage detecting circuit 12-1$m$ including the voltage detecting apparatus for the battery pack shown in FIG. 1.

DESCRIPTION OF THE PREFERRED EMBODIMENT

Figure 1:
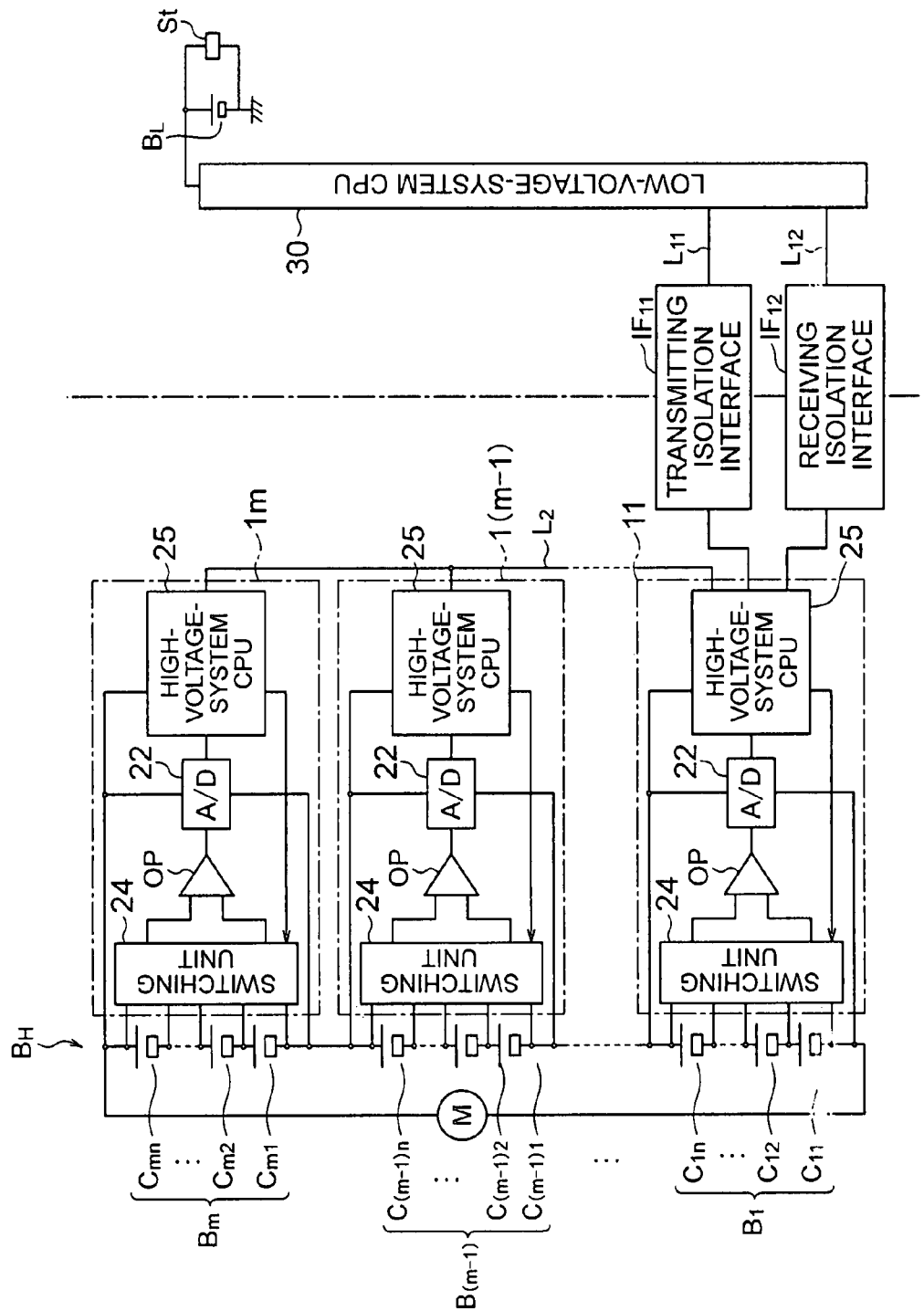
FIG. 1 is a block view showing a first embodiment of a voltage detecting apparatus for a battery pack including a malfunction detecting apparatus according to the present invention.

Embodiments of the present invention are explained by referring to drawings. FIG. 1 is a block diagram of an embodiment of a voltage detecting apparatus of a battery pack including a malfunction detecting apparatus according to the present invention. Reference mark BL in FIG. 1 is a low voltage battery (in-vehicle low voltage battery). As shown in FIG. 1, the low voltage battery BL includes a secondary battery. The low voltage battery BL powers a starter St to start an engine and is connected with an alternator as a battery charger.

Reference mark BH in FIG. 1 is a high voltage battery as a battery pack. The high voltage battery BH powers an electric motor M of a Hybrid Electric Vehicle (HEV) using the engine and the electric motor M together as drive sources and is appropriately connected at both terminals thereof with the electric motor M as a load and the alternator (not shown) as the battery charger.

The high voltage battery BH is divided into "m" blocks B1-Bm (m: an arbitrary integral number). Each block B1-Bm has "n" unit cells of C11-Cm (n: an arbitrary integral number). Each unit cell C11-Cm has "x" secondary batteries (x: an arbitrary integral number).

The voltage detecting apparatus has the plurality of voltage detecting circuits 11-1$m$ as a voltage detecting device, and a low-voltage-system CPU 30 as a malfunction detecting device. The low-voltage-system CPU 30 is powered by the low voltage battery BL. Each voltage detecting circuit 11-1$m$ is disposed corresponding to each block B1-Bm. Each voltage detecting circuit 11-1$m$ is powered only by the respective block B1-Bm corresponding to the each circuit 1-1$m$, which is provided with the unit cells C11-Cmn. That is, the voltage detecting circuits 11-1$m$ have respective ground levels at negative terminals of the blocks B1-Bm and the ground levels thereof are deferent from each other, so that withstand voltages of the voltage detecting circuits 11-1$m$ can be reduced.

Each voltage detecting circuit 11-1$m$ has a differential amplifier OP detecting an output voltage between both terminals of each unit cell C11-Cm, a switching unit 24 connecting the terminals of one unit cell from among the unit cells C11-Cmn included in each block B1-Bm to the differential amplifier OP, an A/D converter 22 converting the detected voltage between both terminals to a digital value, and a high-voltage-system CPU 25 as a control device to control the switching unit 24. Each switching unit 24 has a plurality of switches, each of the switches being connected to both terminals of the each unit cell C11-Cm.

The above voltage detecting apparatus has a transmitting line L11 and a receiving line L12 as a first communication line, a transmitting isolation interface IF11 and an receiving isolation interface IF12 as an isolation interface, and a communication line L2. The transmitting line L11 and the receiving line L12 are arranged between the-high-voltage system CPU 25 of the voltage detecting circuit 11 and the low-voltage-system CPU 30 of the voltage detecting circuit 11 (corresponding to one of the plurality of voltage detecting devices).

The transmitting isolation interface IF11 is arranged on the transmitting line L11, and isolatingly connects the high-voltage-system CPU 25 of the voltage detecting circuit 11 and the low-voltage-system CPU 30. The receiving isolation interface IF12 is arranged on the receiving line L12, and isolatingly connects the high-voltage-system CPU 25 of the voltage detecting circuit 11 and the low-voltage-system CPU 30.

The high voltage battery BH and the low voltage battery BL are isolated from each other by the transmitting isolation interface IF11 and the receiving isolation interface IF12. As the transmitting isolation interface IF11 and the receiving isolation interface IF12, optical devices such as photo-couplers formed with a light emitting element and a light detecting element, or magnetic devices such as magnetic-coupler are known. The communication line L2 is arranged between the voltage detecting circuit 11 and the voltage detecting circuits 12-1$m$ (corresponding to a remainder of the plurality of voltage detecting devices).

Action of the voltage detecting apparatus of the battery pack structured above will be described with reference in FIG. 2-FIG. 4. FIG. 2 is a flowchart showing processes for detecting a malfunction of the low-voltage-system CPU 30 having the voltage detecting apparatus for the battery pack shown in FIG. 1. FIG. 3 is a flowchart showing processes for detecting a malfunction of the high-voltage-system CPU 25 having the voltage detecting apparatus for the battery pack shown in FIG. 1. FIG. 4 is a flowchart showing processes for detecting a malfunction of the high-voltage-system CPU 25 of voltage detecting circuits 12-1$m$ having voltage detecting apparatus of the battery pack shown in FIG. 1.

The low-voltage-system CPU 30 works as an equalization device when switching off the vehicle ignition, and controls the plurality of voltage detecting circuits 11-1$m$ to detect the voltage between both terminals of each unit cell C11-Cmn. The low-voltage-system CPU 30 equalizes each unit cell C11-Cmn based on the voltages between both terminals of each unit cell C11-Cmn detected. As an equalization device, there are a charge pump method which transmits an electrical charge from unit cells having high voltage between both terminals among the unit cells C11-Cmn to the unit cells having low voltage between both terminals among the unit cells C11-Cmn by using a capacitor, and an electrical discharge method which discharges the unit cells having high voltage between both terminals among the unit cells C11-Cmn.

Thereafter, when switching on the vehicle ignition, the low-voltage-system CPU 30 judges that a process condition for detecting the malfunction is fulfilled (Y at step S1 in FIG. 2), and the process goes to next step S2. The high voltage battery BH is not charged and discharged during switching off the vehicle ignition. For this reason, when switch the vehicle ignition off, the equalization is performed at this point. Thereby, just after switching the vehicle ignition on, when the plurality of voltage detecting circuits 11-1$m$ is in a normal condition, each voltage between both terminals of the unit cells C11-Cmn detected by the plurality of voltage detecting circuits 11-1$m$ has the same value.

In step S2, the low-voltage-system CPU 30 transmits the detection instruction to the voltage detecting circuit 11. The detection instruction is transmitted to the high-voltage-system CPU 25 of the voltage detecting circuit 11 through the transmitting line L11 and the transmitting isolation interface IF11. The high-voltage-system CPU 25 of the voltage detecting circuit 11 transmits a synchronization signal to the voltage detecting circuits 12-1$m$ (step S8 in FIG. 3).

After the high-voltage-system CPU 25 of the voltage detecting circuit 11 detects the voltage between both terminals of the last unit cell C11 in the block E1 corresponding to the voltage detecting circuit 11 (Step S9 in FIG. 3). In the step S9, the high-voltage-system CPU 25 of the voltage detecting circuit 11 controls the switching unit 24 to connect both terminals of the last unit cell C11 in the block B1 with the differential amplifier OP.

Thereby, the differential amplifier OP outputs the voltage between both terminals of the last unit cell C11. The A/D converter 22 converts the voltage between both terminals of the last unit cell C11 into a digital datum. The high-voltage-system CPU 25 of the voltage detecting circuit 11 detects an output from the A/D converter 22 as the voltage between both terminals of the last unit cell C11.

The above synchronization signal is transmitted to the high-voltage-system CPU 25 of the voltage detecting circuit 12-1$m$ through the communication line L2. When receiving the synchronization signal (Y at step S12 in FIG. 4), each high-voltage-system CPU 25 of the voltage detecting circuits 12-1$m$ detects the voltage between both terminals of each last unit cell C21-Cm1 in the blocks B2-Bm corresponding to the voltage detecting circuits 12-1$m$ (step S13 in FIG. 4). In this step S13, the high-voltage-system CPU 25 of the voltage detecting circuit 12-1$m$ controls the switching unit 24 to connect both terminals of the last unit cell C21-Cm1 in the block B2-Bm with the differential amplifier OP.

Thereby, the differential amplifier OP outputs the voltage between both terminals of the last unit cell C21-Cm1. A/D converter 22 converts the voltage between both terminals of the last unit cell C21-Cm1 into a digital datum. The high voltage line CPU 25 of the voltage detecting circuits 12-1$m$ detects an output digital datum from the A/D converter 22 as a voltage between both terminals of the last unit cells C21-Cm1.

After the high-voltage-system CPU 25 of each voltage detecting circuit 12-1$m$ transmits datum of the voltage between both terminals of each last unit cell C21-Cm1 detected at step 13 to the voltage detecting circuit 11 (step S14 in FIG. 4), step S14 goes back to step S12. The datum of the voltage between both terminals of the last unit cell C21-Cm1 is transmitted to the high-voltage-system. CPU 25 of the voltage detecting circuit 11 through the communication line L2.

When receiving the datum of the voltage between both terminals of the last unit cell C21-Cm1, which is detected by the voltage detecting circuit 12-1$m$ (step S10 in FIG. 3), the high-voltage-system CPU 25 of the voltage detecting circuit 11 transmits the received datum of each last unit cell C21-Cm1 and the last unit cell C11 detected by the voltage detecting circuit 11 to the low-voltage-system CPU 30 (step S11 in FIG. 3). After that, step S11 goes back to step S7.

The datum of the voltage between both terminals of the last unit cell C11-Cm1 detected by the voltage detecting circuits 11-1$m$ is transmitted to the low-voltage-system CPU 30 through the receiving line L12 and the receiving isolation interface IF12. When the low-voltage-system CPU 30 receives the datum of the voltage between both terminals of the last unit cell C11-Cm1 detected by the voltage detecting circuits 11-1$m$ (step S3 in FIG. 2), the low-voltage-system CPU 30 compares the datum of the each last unit cell C11-Cm1, and calculates a compared value (variation) (step S4 in FIG. 2). The compared value means a difference between a maximum value and a minimum value of the datum of the voltage between both terminals of each last unit cell C11-Cm1.

When the calculated compared value is lager than an allowable error (threshold value) determined by a detection accuracy of the voltage detecting circuits 11-1$m$, the low-voltage-system CPU 30 judges that there is an abnormal condition in the voltage detecting circuits 11-1$m$. Thereby, the process for the abnormal condition is initiated, after reporting the abnormal condition to a host system (step S6), step S6 goes back to step S1 again. On the other hand, when the calculated compared value is not lager than the allowable error (N at step S5 in FIG. 2), the low-voltage-system CPU 30 judges that the voltage detecting circuits 11-1$m$ is in a normal condition, and step S5 goes back to step Si directly.

In the above mentioned voltage detecting apparatus of the assembled battery, the low-voltage-system CPU 30 controls the plurality of voltage detecting circuits 11-1$m$ to detect the voltage between both terminals of the last unit cell C11-Cm1.

The low-voltage-system CPU 30 detects the abnormal condition of the voltage detecting circuits 11-1m by comparing each voltage between both terminals of each last unit cell C11-Cm1 detected by the voltage detecting circuit. The abnormal condition of the voltage detecting circuits 11-1m can be detected accurately because each voltage between both terminals of the last unit cell C11-Cm1 including a detecting error in a same range is compared to each other.

According to the above voltage detecting apparatus for the battery pack, the low-voltage-system CPU 30 equalizes each voltage between both terminals of the unit cells C11-Cmn, which is detected by the plurality of voltage detecting circuits 11-1m, when switching off the vehicle ignition. Also, when switching on the vehicle ignition, the low-voltage-system CPU 30 controls each of the plurality of the voltage detecting circuits 11-1m to detect each voltage between both terminals of the last unit cell C11-Cm1. Therefore, when switching off the vehicle ignition, the equalization of the voltage between both terminals of the unit cells C11-Cmn is performed. Thereby, when switching on the vehicle ignition, the voltage between both terminals of the unit cells C11-Cmn is almost equal. For this reason, it can be judged that variations of the voltage between both terminals of the last unit cell C11-Cm1 detected when switching on the vehicle ignition is caused by the abnormal condition of the voltage detecting circuits 11-1m. Then, the abnormal condition of the voltage detecting circuits 11-1m can be detected more accurately.

According to the above voltage detecting apparatus for the battery pack, after the voltage detecting circuit 11 transmits the synchronization signal, the voltage between both terminals of the last unit cell C11 is detected. The voltage detecting circuit 11-1m detects the voltage between both terminals of the last unit cell C21-Cm1 according to the receiving of the synchronization signal. As a result, each voltage detecting circuit 11-1m can detect the voltage between both terminals of each last unit cell C11-Cm1 at the same time. Therefore, the low-voltage-system CPU 30 can compare each voltage between both terminals of the last unit cell C11-Cm1 detected at the same time, and detect the abnormal condition of the voltage detecting circuits 11-1m more accurately.

According to the above voltage detecting apparatus for the battery pack, the low-voltage-system CPU 30 transmits the detection instruction to the voltage detecting circuit 11 through the sending line L11 and the transmitting isolation interface IF11. The voltage detecting circuit 11 transmits the synchronization signal to the voltage detecting circuits 12-1m through the communication line L2 according to the detection instruction. The voltage detecting circuits 12-1m detects each voltage between both terminals of the last unit cell C21-Cm1 in the blocks B2-Bm according to transmitting of the synchronization signal. Consequently, it is not required that the transmitting line L11, the receiving line L12, the transmitting isolation interface IF11 and the receiving isolation interface IF12 are arranged between the low voltage line CPU 30 and all of the voltage detecting circuits 11-1m. By providing the transmitting line L11, the receiving line L12, the transmitting isolation interface IF11 and the receiving isolation interface IF12 only between the low voltage line CPU 30 and the voltage detecting circuit 11, each voltage detecting circuit 11-1m can detect the voltage between both terminals of the last unit cell C11-Cm1 at the same time. Thereby, the configuration of the voltage detector becomes simple and manufacturing cost is reduced.

According to the above embodiment, the voltage detecting circuits 11-1m detect the voltage between both terminals of the last unit cell C11-Cm1 in the blocks B1-Bm. The embodiments of the present invention are not limited thereto. The voltage detecting circuits 11-1m can preferably detect one of the unit cells C11-Cmn in the blocks B1-Bm, for example, the voltage between both terminals of top unit cells C1n-Cmn in the blocks B1-Bm can be detected.

According to the above embodiment, the voltage detecting circuits 11-1m detect the voltage between both terminals of the last unit cells C11-Cm1 at the same time. The present invention is not limited thereto. For example, when switching on the vehicle ignition, the minimum cells C11-Cmn in the blocks B1-Bm may be detected in order. The apparatus according to the present invention does not detect the voltage between both terminals of all unit cells C11-Cmn such as a conventional apparatus. The apparatus according to the present invention may detect the voltage between both terminals of one unit cell in each block B1-Bm. The high voltage battery BH is unlikely to change by the vehicle condition while the last unit cell C11-Cmn is detected. Therefore, the voltage detecting apparatus can detect the malfunction of the voltage detecting circuits 11-1m accurately.

According to the above embodiment, the transmitting line L11, the receiving line L12, the transmitting insulator interface IF11 and the receiving insulator interface IF12 is arranged between the low-voltage-system CPU 30 and the voltage detecting circuit 11. The communication line L2 is arranged between the voltage detecting circuit 11 and the voltage detecting circuit 12-1m. However, the present invention is not limited thereto. For example, when increasing manufacturing cost is allowable, the transmitting insulator interface L11, the receiving line L12, the insulated interface IF11 and the receiving insulator interface IF12 can be arranged between the low voltage line CPU 30 and each voltage detecting circuit 11-1m.

The embodiments of the present invention are only exemplary and not limited thereto. Any modification and alteration thereof can be allowed within the scope of the present invention.

What is claimed is:

1. A malfunction detecting apparatus comprising:
   a plurality of voltage detecting devices for detecting a voltage between both terminals of each unit cell, which is a secondary battery type, included in respective blocks, the voltage detecting device being provided for each block of the respective blocks divided from a battery pack formed with a plurality of unit cells connected in series with each other; and
   a malfunction detecting device detecting an abnormal condition of the voltage detecting devices based on the voltage between both terminals of each cell, which is detected by each voltage detecting device,
   wherein the malfunction detecting device controls each voltage detecting device to detect the voltage between both terminals of one unit cell from among the unit cells included in each block, which is provided correspondingly to each of the voltage detecting devices,
   and detects the abnormal condition of the voltage detecting device when a dispersion of each detected voltage between both terminals is at least a threshold value determined by a detection accuracy of the voltage detecting devices,
   said malfunction detection apparatus further comprising an equalization device equalizing each voltage between both terminals of the unit cells, based on the voltages between both terminals of the unit cells which are detected by the plurality of voltage detecting devices when a vehicle ignition is switched off,
   wherein the malfunction detecting device controls each voltage detecting device to detect the voltage between both terminals of one unit cell from among the unit cells included in each block at the same time, which is provided correspondingly to each of the voltage detecting devices when the vehicle ignition is switched on, such that, just after switching the vehicle ignition on, the voltage between both terminals of the unit cells is almost equal, with variations of the voltage between both terminals of the unit cells detected when switching on the vehicle ignition being caused by the abnormal condition of the voltage detecting unit.

2. The malfunction detecting apparatus as claimed in claim 1, wherein the malfunction detecting device controls each voltage detecting device to simultaneously detect each voltage between both terminals of the one unit cell from among the unit cells included in each block, which is provided correspondingly to each of the voltage detecting devices.

3. The malfunction detecting apparatus as claimed in claim 2, further comprising:
- a first communication line connecting between one of the plurality of voltage detecting devices and the malfunction detecting device;
- an isolation interface arranged on the first communication line for communicating between the one of the plurality of voltage detecting devices and the malfunction detecting device in an isolation condition; and
- a second communication line connecting between the one of the plurality of voltage detecting devices and a remainder of the plurality of voltage detecting devices other than the one,
- wherein the malfunction detecting device transmits a detection instruction, which makes the one of the plurality of voltage detecting devices detect the voltage between both terminals of the one unit cell from among the unit cells included in the corresponding block, through the first communication line and the isolation interface, to the one of the plurality of voltage detecting devices,
- wherein the one of the plurality of voltage detecting devices transmits a synchronization signal to a remainder of the voltage detecting devices through the second communication line according to the detection instruction,
- and the remainder of voltage detecting devices detects the voltage between both terminals of the one unit cell from among the unit cells included in the corresponding block, according to transmitting the synchronization signal.

4. The malfunction detecting apparatus as claimed in claim 1, further comprising:
- a first communication line connecting between one of the plurality of voltage detecting devices and the malfunction detecting device;
- an isolation interface arranged on the first communication line for communicating between the one of the plurality of voltage detecting devices and the malfunction detecting device in an isolation condition; and
- a second communication line connecting between the one of the plurality of voltage detecting devices and a remainder of the plurality of voltage detecting devices other than the one,
- wherein the malfunction detecting device transmits a detection instruction, which makes the one of the plurality of voltage detecting devices detect the voltage between both terminals of the one unit cell from among the unit cells included in the corresponding block, through the first communication line and the isolation interface, to the one of the plurality of voltage detecting devices,
- wherein the one of the plurality of voltage detecting devices transmits a synchronization signal to a remainder of the voltage detecting devices through the second communication line according to the detection instruction,
- and the remainder of voltage detecting devices detects the voltage between both terminals of the one unit cell from among the unit cells included in the corresponding block, according to transmitting the synchronization signal.

5. A malfunction detecting apparatus comprising:
- a plurality of voltage detecting devices for detecting a voltage between both terminals of each unit cell, which is a secondary battery type, included in respective blocks, the voltage detecting device being provided for each block of the respective blocks divided from a battery pack formed with a plurality of unit cells connected in series with each other; and
- a malfunction detecting device detecting an abnormal condition of the voltage detecting devices based on the voltage between both terminals of each cell, which is detected by each voltage detecting device,
- wherein the malfunction detecting device controls each voltage detecting device to detect the voltage between both terminals of one unit cell from among the unit cells included in each block, which is provided correspondingly to each of the voltage detecting devices,
- and detects the abnormal condition of the voltage detecting device when a dispersion of each detected voltage between both terminals is at least a threshold value determined by a detection accuracy of the voltage detecting devices,
- said malfunction detection apparatus further comprising an equalization device equalizing each voltage between both terminals of the unit cells, based on the voltages between both terminals of the unit cells which are detected by the plurality of voltage detecting devices only when a vehicle ignition is switched off,
- wherein the malfunction detecting device controls each voltage detecting device to detect the voltage between both terminals of one unit cell from among the unit cells included in each block in order, which is provided correspondingly to each of the voltage detecting devices when the vehicle ignition is switched on, such that, just after switching the vehicle ignition on, the voltage between both terminals of the unit cells is almost equal with variations of the voltage between both terminals of the unit cells detected when switching on the vehicle ignition being caused by the abnormal condition of the voltage detecting unit.

* * * * *